United States Patent [19]

Kakuta et al.

[11] Patent Number: 4,859,500

[45] Date of Patent: Aug. 22, 1989

[54] METHOD FOR PREPARING A MAGNETIC RECORDING MEDIUM

[75] Inventors: Takeshi Kakuta; Takahito Miyoshi, both of Kanagawa, Japan

[73] Assignee: Fuji Photo Film Co., Ltd., Kanagawa, Japan

[21] Appl. No.: 109,023

[22] Filed: Oct. 16, 1987

[30] Foreign Application Priority Data

Oct. 16, 1986 [JP] Japan .................................. 61-244035

[51] Int. Cl.$^4$ .............................................. H01F 10/02
[52] U.S. Cl. .................................... 427/128; 428/694; 428/900
[58] Field of Search .............................. 427/127–132, 427/48; 428/694, 900

[56] References Cited

U.S. PATENT DOCUMENTS 4,569,856  2/1986  Miyoshi et al. ................. 428/900 X Primary Examiner—Bernard Pianalto
Attorney, Agent, or Firm—Sughrue, Mion, Zinn, Macpeak & Seas

[57] ABSTRACT

A method for preparing a magnetic recording medium comprising the steps of pre-dispersing ferromagnetic particles and a binder in a solvent, mixing and dispersing with an additional binder, and coating thus obtained magnetic coating composition on a support, wherein said ferromagnetic particles having a specific surface area $S_{BET}$ of 40 m$^2$/g or more and an absorved moisture content of less than 0.8 wt. % are pre-dispersed in said solvent containing cyclohexanone in an amount of 80 wt. % or more.

5 Claims, No Drawings

METHOD FOR PREPARING A MAGNETIC RECORDING MEDIUM

FIELD OF THE INVENTION

The present invention relates to a method for preparing a magnetic recording medium, and more particularly it relates to a method for preparing a magnetic recording medium having particularly improved surface gloss, squareness ratio, and video S/N (signal/-noise ratio).

BACKGROUND OF THE INVENTION

A coating type magnetic recording medium is prepared by dispersing ferromagnetic particles in a binder and coating the thus obtained coating solution on a nonmagnetic support and, if necessary, conducting magnetic orientation and smoothing treatment thereon.

Recently, a magnetic recording medium (hereinafter referred to as "a magnetic tape") has been required to have improved characteristics and various improvements have been done. One of these characteristics is S/N ratio. It has been suggested that one approach to improve S/N ratio of a coating type magnetic tape is that ferromagnetic particles having a lower particle size and having a higher specific surface area be used. In this instance, it is necessary that ferromagnetic particles should be homogeneously dispersed in a binder and that the surface of the coated magnetic layer should be smoothed. However, as the particle size of the ferromagnetic particles becomes lower, it becomes more difficult to disperse the ferromagnetic particles homogeneously in the binder, thereby deteriorating the orientation of ferromagnetic particles and smoothness of the surface of the magnetic layer. As a result, a higher S/N ratio can not be obtained.

In order to improve dispersibility of ferromagnetic fine particles, various binder dispersing assistants and various mixing and kneading methods using kneading machines, such as a two-roll mill, a three-roll mill, an open kneader, a kneader under pressure, or a continuous kneader, have generally been considered.

The above described two-roll mill, three-roll mill, open kneader, kneader under pressure, and continuous kneader are used to mix and knead a coating composition for a magnetic tape. The mixing and kneading degree varies depending upon characteristics of ferromagnetic particles, additive amounts of a binder and a solvent with using anyone of the above described kneaders. Therefore, it has been extremely difficult to obtain a coating solution having a desired degree of dispersion. It has been found that as the particle size of magnetic particles becomes lower, it becomes more difficult to obtain a desired degree of dispersibility. Accordingly, it has been difficult to obtain a magnetic tape having a good dispersibility and having a high S/N ratio with a conventional dispersing method when the particle size of the magnetic particles is very small.

The present inventors found that when the particle size of ferromagnetic particles is low, that is, when the specific surface area thereof is high, it is difficult to disperse the magnetic particles, but it becomes easy to disperse the magnetic particles when the content of adsorbed moisture is increased. According to the above discovery, the present inventors provided a method for preparing a magnetic recording medium which comprises adjusting the adsorbed moisture content of ferromagnetic particles having a specific surface area $S_{BET}$ of 35 m$^2$/g or more to 0.8 wt % or more, pre-dispersing the ferromagnetic particles in a solvent with a binder, adding an additional binder and a lubricating agent thereto, mixing and dispersing the mixture, and coating the thus prepared coating solution on a support, as disclosed in U.S. Pat. No. 4,569,856 corresponding to Japanese Patent Application (OPI) No. 187931/85 (the term "OPI" as used herein means an "unexamined published patent application").

In accordance with the above method, the problems of the prior art have been, in a way, solved, but there are still problems in that it requires a long term to mix and knead upon preparation of a magnetic coating composition and the dispersibility is still rather insufficient.

SUMMARY OF THE INVENTION

An object of the present invention is, therefore, to provide a method for preparing a magnetic recording medium which is significantly improved in the dispersibility of the ferromagnetic fine particles upon pre-dispersion and significantly shortened in the time required for mixing and kneading.

Another object of the present invention is to provide a method for preparing a magnetic recording medium having improved surface gloss, squareness ratio, and video S/N.

In order to accomplish the above and other objects, the present inventors have conducted extensive research as to the adsorbed moisture content of the ferromagnetic particles, the time for mixing and kneading, and the method for dispersing in the above method, and as a result have found that mixing and kneading can be sufficiently conducted, dispersion can be significantly improved, and the period for mixing and kneading can be significantly shortened by reducing the adsorbed moisture content of the magnetic particles and using a solvent predominantly containing cyclohexanone as a mixing and kneading solvent upon pre-dispersing.

That is, the present invention provides a method for preparing a magnetic recording medium comprising the steps of pre-dispersing ferromagnetic particles and a binder in a solvent, mixing and dispersing with an additional binder, and coating the thus obtained magnetic coating composition on a support, wherein the ferromagnetic particles having a specific surface area $S_{BET}$ of 40 m$^2$/g or more and an absorbed moisture content of less than 0.8 wt % are pre-dispersed in the solvent containing cyclohexanone in an amount of 80 wt % or more.

DETAILED DESCRIPTION OF THE INVENTION

The present invention is described in more detail below.

Examples of the ferromagnetic particles used in the present invention include ferromagnetic iron oxide particles represented by FeO$_x$, Co-containing FeO$_x$ (4/3 ≤ x ≤ 3/2) and ferromagnetic chromium dioxide particles having a specific surface area $S_{BET}$ of 40 m$^2$/g or more. The specific surface area $S_{BET}$ used herein is determined by the BET method which is described specifically, e.g., in G. D. Parfitt & K. S. W. Sing, *Characterization of Powder Surfaces,* Academic Press (1976).

In the prior art described in Japanese Patent Application No. (OPI) 187931/85, ferromagnetic particles having an adsorbed moisture content (water content) adjusted to 0.8 wt % or more were used, but in the present invention, the water content thereof was adjusted to less than 0.8 wt %. This adjustment is conducted by drying at from 30° to 60° C. under dry oven conditions for from 24 to 72 hours.

Preferred binders used in the present invention are those which are commonly used for preparing a coated type magnetic recording medium, such as thermoplastic resins, e.g., a sulfonic acid group containing vinyl chloride type copolymer, a terpolymer of maleic acid, vinyl chloride and vinyl acetate, a copolymer of vinyl chloride and vinylidene chloride, a cellulose resin, an acethal resin, a urethane resin, and an acrylonitrilebutadiene resin, and such binders can be used alone or in combination.

Those binders can be used in the pre-dispersing step and in the subsequent mixing and dispersing step, and the same or different binders can be used in both the above described steps.

The solvent used in the pre-dispersing step in the present invention contains cyclohexanone in an amount of 80 wt % or more, and preferably 90 wt % or more, based on the total amount of the solvent. Solvents used in the present invention other than cyclohexanone include those generally used for a coating type magnetic recording medium and having compatibility with cyclohexanone, e.g., ketones such as acetone, methyl ethyl ketone, methyl isobutyl ketone, and ethyl isobutyl ketone; esters such as methyl acetate, ethyl acetate, butyl acetate, and monoethyl ether of glycol acetate; glycol ethers such as ether, glycol dimethyl ether, and dioxane; aromatic hydrocarbons such as benzene, toluene, and xylene; or chlorinated hydrocarbons such as methylene chloride, ethylene chloride, carbon tetrachloride, chloroform, ethylene chlorohydrin, and dichlorobenzene, which can be used alone or in combination.

As a matter of course, pure cyclohexanone can be used as a solvent.

The amount of the solvent used in the predispersing step is generally from 5 to 50 parts by weight, preferably from 10 to 40 parts by weight, and more preferably from 10 to 30 parts by weight per 100 parts by weight of the ferromagnetic particles.

Lubricating agents such as a fatty acid, a fatty acid ester, a silicone oil, a molybdenum bisulfide, a tungsten bisulfide, a carbon black, and graphite can be added to the above predispersing system, if necessary.

In the pre-dispersing step in the present invention, the above described ferromagnetic fine particles, a binder, and, if necessary, additives are mixed, kneaded and dispersed homogeneously with a solvent containing cyclohexanone in an amount of 80 wt % or more. A two roll mill, a three roll mill, an open kneader, a kneader under pressure, a continuous kneader, etc. are used for dispersing the mixture.

By adjusting the water content of the ferromagnetic fine particles to less than 0.8 wt % and by the use of asolvent containing cyclohexanone in an amount of 80 wt % or more at the pre-dispersing step, which is the feature of the present invention, dispersion can homogeneously be conducted with ease, the period of term for pre-dispersing can be significantly shortened, and thus a sufficiently homogeneous dispersion can be obtained in 5 minutes to 1 hour.

The thus obtained dispersion in the first predispersing step is then mixed and dispersed with a binder, and, if necessary, an additive such as a lubricating agent and an abrasive agent using a solvent at the second mixing and dispersing step to prepare a magnetic coating composition.

As the binders and solvents used in the second mixing and dispersing step, those used in the first predispersing step can be used. In this case, the solvents used in the mixing and dispersing step are not limitative and may or may not contain cyclohexanone. The lubricating agents may be those used in the first step and can be added at the pre-dispersing step or at the mixing and dispersing step. The abrasive agents include $\alpha$-$Al_2O_3$, silicon carbide, chromium oxide ($Cr_2O_3$), corundum, artificial corundum, diamond, artificial diamond, garnet, emery and titanium oxide ($TiO_2$ and $TiO$).

A sand grinder, a ball mill, an Attritor, etc. may be used for mixing and dispersing. The dispersion and mixing term for 60 to 300 minutes is preferred. In the present invention, since homogeneous dispersing is done at the pre-dispersing step, mixing and dispersing at the second step is therefore easily and homogeneously conducted, resulting in shortening the time for dispersion.

The resulting magnetic coating composition is then coated on a nonmagnetic support.

The nonmagnetic support used in the present invention is not limitative, and those generally used can be used, such as various synthetic resin films, e.g., polyethylene terephthalate (PET), polypropylene, polycarbonate, polyethylene naphthalate, polyamide, polyamide or polyimide, or metal foils such as aluminum foil or a stainless foil. The thickness of the non-magnetic support is not limitative, and is generally from 3 to 50 $\mu$m, and preferably from 5 to 30 $\mu$m.

The methods for coating the magnetic coating composition on a nonmagnetic support include an air doctor coating method, a blade coating, method, a rod coating method, an extruding coating method, an air knife coating method, a squeeze coating method, an impregnating coating method, a reverse roll coating method, a transfer roll coating method, a gravure coating method, a kiss coating method, a cast coating method, a spray coating method, and a spin coating method. Another coating methods can also be used. The specific description on those coating methods is described in detail in *Coating Koqaku* (Coating Engineering) pp. 253 to 277, published on Mar. 20, 1971 by Asakura Shoten.

A multi-layered magnetic recording medium can be prepared by continuously repeating the steps of coating a magnetic layer with the above described coating method and drying to prepare multiple magnetic layers. Further, two or more multiple magnetic layers may be provided simultaneously by a multiple simultaneous coating method as disclosed in Japanese Patent Application Nos. 98803/73 (West German Patent No. DT-OS 2,309,159) and 99233/73 (West German Patent No. DT-AS 2,309,158).

The magnetic layer is coated so that the dry thickness is from about 0.5 to 12 $\mu$m. The total thickness of the multiple layers is preferably within the above range. The dry thickness is determined depending upon the purpose, shapes, and standards of the magnetic recording medium.

The magnetic layer provided on a support is, if necessary, subjected to magnetic orientation to have magnetic particles contained in the layer orientated and then dried. The thus dried magnetic layer is, if necessary, subjected to surface smoothing treatment, and cut to a desired width to prepare a magnetic recording medium according to the present invention.

When the magnetic recording layer of the present invention is particularly subjected to surface smoothing treatment, a magnetic recording medium having good surface property and excellent wear resistance can be obtained.

The surface smoothing treatment is done by a smoothing treatment before drying or by calendering treatment after drying.

Thus in this manner, a magnetic recording medium of the present invention can be prepared by conducting homogeneous pre-dispersing in a short period of time and a magnetic recording medium having a high squareness ratio (SQ) and an S/N ratio can be obtained.

A magnetic recording medium of the present invention can also be prepared by a method using the materials which are disclosed in Japanese Patent Application (OPI) No. 108804/77.

The present invention is further described more specifically by the following Example.

In the Example, all parts are by weight.

EXAMPLE

Co-containing ferromagnetic iron oxide having a predetermined specific surface area ($S_{BET}$) as described in Table 1 was dried so that the ferromagnetic iron oxide had the predetermined water content. The following steps were conducted. The coating composition was coated on a polyethylene terephthalate base having a thickness of 14 μm by a reverse roll coating method so that the dry thickness was 5 μm, and then dried. The thus obtained magnetic layer was subjected to surface smoothing treatment, and slit to a width of ½ inch to obtain a magnetic tape.

(1) Steps of preparing a magnetic coating composition including a pre-dispersing step:

The following compositions were pre-dispersed by an open kneader so that the mixed dispersion became homogeneous and subsequently mixed and dispersed by a sand grinder using glass beads. Thus the coating composition was prepared.

| (Composition at pre-dispersing step) A-1 | |
|---|---|
| Co-containing magnetic iron oxide (specific surface area and water content are shown in Table 1) | 100 parts |
| Sulfonic acid group containing copolymer of vinyl chloride and vinyl acetate | 10 parts |
| Carbon black | 3 parts |
| Solvent (kind, amount shown in Table 1) | |
| (Composition at mixing and dispersing step) B-1 | |
| Pre-dispersed solution | 163 parts |
| Urethane resin | 6 parts |
| Butyl stearate | 1 part |
| $Cr_2O_3$ | 2 parts |
| Methyl ethyl ketone | 200 parts |
| (Composition at final step) C-1 | |
| Mixed and dispersed solution | 372 parts |
| Stearic acid | 1 part |
| Oleic acid | 1 part |
| Polyisocyanate ("Collonate L", a trade name, manufactured by Nippon Polyurethane Co., Ltd.) | 10 parts |

The thus prepared samples were evaluated in the following manner and the results are shown in Table 1.

Evaluation (1) Time for mixing and dispersing: The time (min.) for a mixture to be uniformly dispersed.
(2) Gloss: The surface gloss of a tape at an angle of 45° was measured with a gloss meter of Suga Testing Machine Co., Ltd.
(3) Squareness ratio: Br/Bm was measured at Hm of 2 KOe using a vibratory flux magnetic meter manufactured by Toei Kogyo Co., Ltd.
(4) Video S/N: Video S/N was measured with a noise meter "925C" manufactured by Shibasoku Co., Ltd., and is shown by relative values when Sample No. 1 is a standard tape. Noise level was measured at 10 KHz through high pass filter and at 4 MHz through a low pass filter. VTR "NV-8300" manufactured by Matsushita Electric Industrial Co., Ltd. was used.

TABLE 1

| Sample No. | Ferromagnetic iron oxide $S_{BET}$ (m²/g) | Adsorbed water content (wt %) | Solvent at pre-dispersing step Kind | Amount* | Time for mixing and dispersing | Gloss | Squareness ratio | Video S/N |
|---|---|---|---|---|---|---|---|---|
| Example 1 | 40 | 0.8 | anone | 50 | 30 min. | 182 | 0.88 | +1.5 |
| Example 2 | 50 | 0.8 | anone | 50 | 40 | 185 | 0.89 | +2.0 |
| Example 3 | 40 | 0.7 | anone/butyl acetate = 8/2 | 30 | 40 | 180 | 0.88 | +1.2 |
| Example 4 | 40 | 0.2 | anone/butyl acetate = 8/2 | 30 | 25 | 182 | 0.87 | +1.0 |
| Example 5 | 40 | 0.7 | anone/butyl acetate = 9/1 | 30 | 30 | 183 | 0.89 | +1.0 |
| Comparative Example 6 | 40 | 1.2 | anone | 50 | 60 | 175 | 0.82 | +0.5 |
| Comparative Example 7 | 40 | 1.0 | butyl acetate/ MEK = ½ | 50 | 90 | 162 | 0.87 | 0 |
| Comparative Example 8 | 40 | 0.7 | butyl acetate/ MEK = 1/1 | 50 | 180 | 150 | 0.78 | −1.5 |

Remarks:
anone = cyclohexanone
*Parts by weight based on 100 parts by weight of ferromagnetic particles.

It is clear from the results shown in Table 1 that a magnetic recording medium prepared with a reduced time for mixing and kneading at a pre-dispersing step and having excellent surface gloss, squareness ratio, and video S/N can be obtained in accordance with the present invention.

While the invention has been described in detail and with reference to specific examples thereof, it will be apparent to one skilled in the art that various changes

What is claimed is:

1. A method for preparing a magnetic recording medium comprising the steps of pre-dispersing ferromagnetic particles and a binder in a solvent, mixing and dispersing with an additional binder, and coating the thus obtained magnetic coating composition on a support, wherein said ferromagnetic particles having a specific surface area $S_{BET}$ of 40 m$^2$ or more and absorbed mosture content of less than 0.8 wt % are pre-dispersed in said solvent containing cyclohexanone in an amount of 80 wt % or more wherein from 5 to 50 parts by weight of said solvent containing cyclohexanone per 100 parts by weight of said ferromagnetic particles is used for the pre-dispersing.

2. A method for preparing a magnetic recording medium as claimed in claim 1, wherein said solvent contains cyclohexanone in an amount of 90 wt % or more.

3. A method for preparing a magnetic recording medium as claimed in claim 1, wherein said ferromagnetic particles are selected from the group consisting of iron oxide particles represented by FeO$_x$, Co-containing FeO$_x$ (4/3≦X≦3/2), and ferromagnetic chromium dioxide particles.

4. A method for preparing a magnetic recording medium as claimed in claim 1, wherein from 10 to 40 parts by weight of said solvent containing cyclohexanone per 100 parts by weight of said ferromagnetic particles is used for the pre-dispersing.

5. A method for preparing a magnetic recording medium as claimed in claim 4, wherein from 10 to 30 parts by weight of said solvent containing cyclohexanone per 100 parts by weight of said ferromagnetic particles is used for the pre-dispersing.

* * * * *

UNITED STATES PATENT AND TRADEMARK OFFICE
CERTIFICATE OF CORRECTION

PATENT NO. : 4,859,500

DATED : AUGUST 22, 1989

INVENTOR(S) : TAKESHI ET AL

It is certified that error appears in the above-identified patent and that said Letters Patent is hereby corrected as shown below:

Column 7, line 12, delete "40 $m^2$" and insert therefor -- 40 $m^2/g$ --.

Column 7, line 13, delete "mosture" and insert therefor -- moisture --.

Signed and Sealed this

Thirtieth Day of October, 1990

Attest:

HARRY F. MANBECK, JR.

*Attesting Officer*    *Commissioner of Patents and Trademarks*